United States Patent [19]
Hamilton

[11] 3,883,541
[45] May 13, 1975

[54] 4-AMINO-3,5,6-TRICHLORO-2-(FUNCTIONALLY SUBSTITUTED METHYL) PYRIDINE COMPOUNDS

[75] Inventor: Pamela M. Hamilton, Sunnyvale, Calif.

[73] Assignee: The Dow Chemical Company, Midland, Mich.

[22] Filed: Mar. 2, 1973

[21] Appl. No.: 337,724

Related U.S. Application Data

[63] Continuation of Ser. No. 117,707, Feb. 22, 1971, abandoned.

[52] U.S. Cl.... 260/295 R; 260/294.9; 260/295 CA; 260/295 AM; 260/295 H; 260/296 R; 260/247.2 A; 71/94
[51] Int. Cl............................................ C07d 31/36
[58] Field of Search ................... 260/295 R

[56] References Cited
UNITED STATES PATENTS 3,285,925  11/1966  Johnston et al.............. 260/294.9
3,609,158   9/1971  Torba.............................. 260/295 R
3,755,339   8/1973  McKendry ..................... 260/295 R Primary Examiner—Alan L. Rotman
Attorney, Agent, or Firm—S. Preston Jones

[57] ABSTRACT

Novel and useful 4-amino-3,5,6-trichloropyridine compounds are disclosed wherein the 2- position of the pyridine ring carries a functionally substituted methyl group such as $-CH_2OH$, $-CH_2Cl$, $-CH_2NH_2$, $-CH_2COOH$, $-CH_2CN$, $-CH_2OCH_3$, $-CH_2OC(O)CH_3$, $-CH_2OCONH_2$ and $CH_2OCH_2COOH$. The compounds of the invention are useful in a variety of pesticidal applications. They also have utility as intermediates in the preparation of other useful organic compounds.

2 Claims, No Drawings 3,883,541

4-AMINO-3,5,6-TRICHLORO-2-(FUNCTIONALLY SUBSTITUTED METHYL) PYRIDINE COMPOUNDS

CROSS-REFERENCE TO RELATED APPLICATION

This is a continuation of application Ser. No. 117,707, filed Feb. 22, 1971, now abandoned.

SUMMARY OF THE INVENTION

The present invention is concerned with new 4-amino-3,5,6-trichloro-2-(functionally substituted methyl) pyridine compounds having the formula:

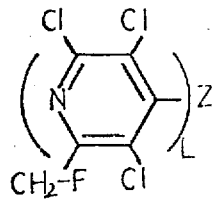

(I)

In this and succeeding formulas, F is a functional group, Z is a residue of a nitrogen base and is attached to the pyridine ring by way of nitrogen, and L is an integer. The expression "4-amino-3,5,6-trichloro-2-(functionally substituted methyl)pyridines" is employed herein to refer to the compounds defined by the above formula. Representative functional groups include those in which F is hydroxy, amino, halo, a carboxylic acid group or functional derivative thereof, a lower oxyaliphatic or amino-oxyaliphatic group, oxycarbamyl, oxyalkanoyl and oxyalkanoic acid groups or functional derivatives thereof. The term "carboxylic acid group or functional derivative thereof" includes those in which F is carboxyl, cyano or a hydrazide, ester, salt or amide derivative of said carboxyl group. Similarly, the term "oxyalkanoic acid group or functional derivative thereof" includes oxyalkanoic acid groups together with the nitrile, hydrazide, ester, salt or amide derivatives of said acid groups. By "nitrogen base" is meant a basic nitrogen compound having at least one replaceable hydrogen grouping $$HN\lessgtr ,$$

and having a basic dissociation constant $K_b$ of at least $10^{-7}$. Each of the free valences in the HN is connected to hydrogen, carbon or nitrogen. Thus excluded are oxidized nitrogen radicals such as nitro or nitroso. Such nitrogen base, which may also be termed "amine compound", can be represented by the formula:

$$(H)_L Z$$

The L in the formula has any integral value of from one up to the number of basic nitrogens having at least one replaceable hydrogen in said nitrogen base. The residue of the nitrogen base identified by Z in the formula is derived by removing L hydrogen atoms from one or more of the basic nitrogens in said nitrogen base.

The free valences of the HN group can be satisfied with radicals such as hydrogen, alkyl, alkenyl, alkynyl, hydroxyalkyl, aralkyl, cycloalkyl, amino, dialkylamino, guanyl, aminoalkyl, poly(aminoalkylene)-aminoalkyl, pyridyl, pyrimidinyl, triazyl, provided at least one of the free valences is joined to hydrogen or carbon; alternatively, the free valences may be joined with a divalent group which, with the nitrogen, forms a heterocyclic ring such as ethyleneimine, trimethyleneimine, pyrrolidine, alkylpyrrolidine, piperidine, alkylpiperidine, piperazine, alkylpiperazine and morpholine.

The compounds of the present invention also embrace those having two trichloro-(F-methyl)pyridyl nuclei joined either directly through the nitrogen or through a divalent group interconnecting the nitrogen; these compounds may be better illustrated by a modified formula

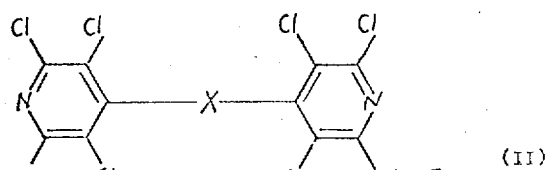

(II)

wherein X may be —HHNH—, —(NHC$\lambda$H$_{2m}$)$_x$NH—, —NHC$_n$H$_{2n}$NH—,

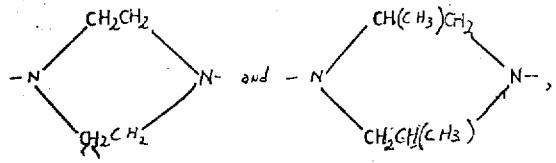

wherein $m$, $n$ and $x$ are integers, or alkylene diamines which may have aminoalkyl or hydroxyalkyl substituents. The compounds of the present invention also embrace those wherein only one trichloro-(F-methyl)pyridyl unit is attached to one nitrogen in a polyamine or in a diamine, H$_2$X.

Preferred embodiments of the present invention are compounds having the formula:

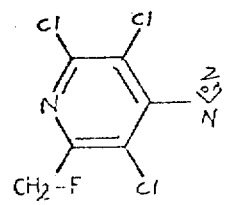

The compounds of the present invention can be prepared by a process whereby the carboxylic acid ester group (exemplified below by -COOCH$_3$) in the 2-position of an aminotrichloropicolinate compound having the formula

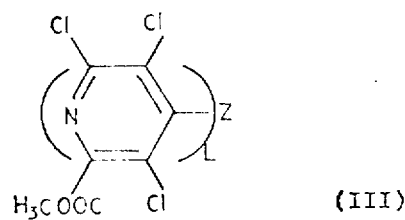

(III)

is converted to a hydroxymethyl group. This group can then be converted to a halomethyl group, inter alia. The remaining aminotrichloro-2-(functionally substituted methyl)pyridine compounds of the invention can be prepared from one or the other of these hydroxymethyl or halomethyl derivatives. In the above Formula III, L is an integer, and Z is the residue of a nitrogen base attached to the pyridine ring by way of nitrogen, said nitrogen base having a basic dissociation constant of $10^{-7}$ or greater and having at least one HN group in which each of the free valences is attached to carbon, hydrogen or nitrogen.

Preferred 4-amino-3,5,6-trichloro-2-(functionally substituted methyl)pyridine compounds of the present invention can be prepared by a process wherein the ester group in the 2- position of a methyl (or other lower alkyl) 4-amino-3,5,6-trichloropicolinate having the formula

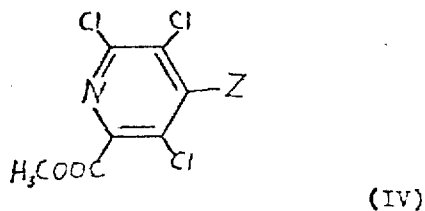

(IV)

is converted to a hydroxymethyl group or functional derivative thereof.

The starting compounds corresponding to Formulas III and IV above which are contemplated for use in preparing the compounds of the present invention can be prepared by first reacting the appropriate nitrogen base, or amine compound, with 3,4,5,6-tetrachloro-2-(trichloromethyl)pyridine to form the corresponding 4-amino-3,5,6-trichloro-2-(trichloromethyl)pyridine compound. This compound is then either directly hydrolyzed (using aqueous acid) to the corresponding 4-amino-3,5,6-trichloropicolinic acid derivative, which is then esterified, or else the ester can be prepared directly from the 4-amino-3,5,6-trichloro-2-(trichloromethyl)pyridine derivative in appropriate cases by reaction with a lower alcohol and water in the presence of silver nitrate. These starting compounds, and the methods of their preparation, are fully set forth in U.S. Pat. No. 3,285,925. It is to be noted that in these starting compounds the (trichloromethyl) radical occupies an α position with respect to the hetero nitrogen. The α positions are numbered 2 and 6. Although generically the starting compounds are referred to herein as containing the (trichloromethyl) radical in the 2- position, it is to be understood that in certain compounds this radical may preferably be designated as occupying the 6- position.

The Z group in the above formulas is a residue of a nitrogen base having a basic dissociation constant of at least $10^{-7}$ and embraces residues of such bases as ammonia, aliphatic, alicyclic and heterocyclic mono and polyamines, as well as such basic or amino compounds as guanidine, hydrazine, and substituted hydrazine. Preferred aliphatic monoamines are those which may be designated as mono- and dialkylamines, alkenylamines, alkynylamines, hydroxyalkylamines, di(hydroxyalkyl)amines and aralkylamines, and examples of such amines include methylamine, ethylamine, n-propylamine, isobutylamine, sec.-butylamine, sec.-amylamine, 2-methyl-n-butylamine, 1,3-dimethylbutylamine, n-hexylamine, 3-amino-n-hexane, 4-amino-n-heptane, 2-amino-n-heptane, n-nonylamine, n-octylamine, decylamine, undecylamine, dodecylamine, tetradecylamine, hexadecylamine, 1,1,3,3-tetramethylbutylamine, 2-amino-2-methylbutane, pentadecylamine, heptadecylamine, hexahydrobenzylamine, and other monoalkylamines containing from 1 to 10 or to 18 carbon atoms, inclusive, dimethylamine, diethylamine, diisopropylamine, di-n-butylamine, ethylmethylamine, diisoamylamine, dioctylamine, methylisopropylamine, N-methyldecylamine, N-methylsec.-butylamine, N-methyldodecylamine, N-methyltetradecylamine, N-methyloctadecylamine, N-ethyloctadecylamine, ethylpropylamine, N-n-butyltetradecylamine, bis(1,3-dimethylbutyl)-amine, N-methyl-2-amino-n-pentane, di-n-heptylamine and other dialkylamines containing from 2 to 20 carbon atoms, inclusive, allylamine, methallylamine, oleylamine, 5-amino-1-pentene, 5-amino-2-hexene and other alkenylamines containing from 3 to 18 carbon atoms, inclusive, α-phenylamine, β-phenylethylamine, 1-phenylpropylamine, 2-phenylpropylamine, α-amino-n-butylbenzene, 3,5-dimethylbenzylamine, 3-phenylpropylamine, 4-methylbenzylamine, 3-methylbenzylamine, 2-methylbenzylamine, N-ethylbenzylamine, N-methylbenzylamine and other aralkylamines containing from 7 to 10 carbon atoms, inclusive, 2-aminopropyl alcohol, 3-amino-n-pentanol, isopropanolamine, 2-amino-3-pentanol, 3-aminopropyl alcohol, 1-amino-2-butanol, diethanolamine, methylaminoethanol, ethylaminoethanol, isopropylaminoethanol, n-butylaminoethanol, bis-( -hydroxypropyl)amine, and other hydroxyalkylamines containing from 2 to 6 or 10 carbon atoms, or di(hydroxyalkyl)amines containing up to 20 carbon atoms, inclusive, and propargylamine and other alkynyl amines.

Suitable aliphatic polyamines include ethylenediamine, diethylenetriamine, triethylenetetramine, tetraethylenepentamine, propylenediamine, 3,3'-diaminodipropylamine, 1,3-diaminobutane, unsym.-diethylethylenediamine, sym.-diethylethylenediamine, hexamethylenediamine, tetramethylenediamine, trimethylenediamine, pentamethylenediamine, 1,2,3-triaminopropane, 1,3-diamino-2-propanol, N-hydroxyethylpropylenediamine, and other aliphatic polyamines containing preferably from 2 to 8 carbon atoms, inclusive, and which may also contain a hydroxyl group.

Suitable alicyclic amines are cyclopropylamine, cyclobutylamine, cyclopentylamine, cyclohexylamine, 2-ethylcyclohexylamine, N-methylcyclohexylamine, N-ethylcyclohexylamine, dicyclohexylamine, 1,2-diaminocyclohexane, 2-aminocyclohexanol, and other primary and secondary amines having preferably from 3 to 6 carbon atoms in the cycloalkyl group and having a total carbon content of from 3 to 12, inclusive, and including hydroxy and amino substituted cycloalkylamines. Suitable non-aromatic heterocyclic amines include ethyleneimine, trimethyleneimine, pyrrolidine, piperidine, 2-methyl-pyrrolidine, 3-methylpyrrolidine, 3-ethylpiperidine, 2,5-dimethylpyrrolidine, 2,4-dimethylpyrrolidine, 2-methylpiperidine, 3-methylpiperidine, 2,6-dimethylpiperidine, 4-ethylpiperidine, 2-ethylpiperidine, 2,2,4-trimethylpiperidine, piperazine, 5-methyl-2-pyrazoline, trans-2,5-dimethylpiperazine and morpholine. Suitable "aromatic" heterocyclic nitrogen bases are 5- and 6-membered rings containing at least one —$NH_2$ radical and which may also contain from 1 to 2 methyl groups, such as 2-aminopyridine, 6-amino-α-picoline, 5-amino-α-picoline, 3-amino-γ-picoline, 4-aminopyridine, 3,4-diaminopyridine, 4-amino-2,6-dimethylpyridine, 2,4-diaminopyridine, 2,5-diaminopyridine, 2,6-diaminopyridine, 2-aminopyridine, 4-aminopyridine, 5-amino-3-methyl-1,2,4-triazole, and 3-amino-1,2,4-triazole. Other basic nitrogen compounds, the residue of which may satisfy the amino group in the above identified formula include hydrazine, methylhydrazine, unsym.-dimethylhydrazine, ethylhydrazine, phenylhydrazine and allylhydrazine.

The functional group F in Formula I includes those which can be represented by the radicals —OH, —Cl, —Br, —I, —$NR^1R^2$, —COOH, —CN, —COOM, —$CONR^1R^2$, —$CONHNR^3$, —$COOR^4$, —$OR^1$, —$OR^5COOH$, —$OR^5CN$, —$OR^5COOM$, —$OR^5CONR^1R^2$, —$OR^5CONHNR^3$, —$OR^5COOR^4$, —$OC(O)R^6$, —$OCONR^1R^2$ and —$OR^5NR^1R^2$. In the above radicals, M represents a salt group inclusive of alkali and alkaline earth salts such as sodium, potassium lithium, magnesium, calcium, salts of other metals such as copper, iron, zinc, cobalt, nickel, ammonium and substituted ammonium salts. Preferred salts include the ammonium, lower alkylamine and lower alkanolamine salts wherein each alkyl and alkanol radical contains from 1 to 10 carbon atoms, such as methylammonium, trimethylammonium, dimethylammonium, ethylammonium, diethylammonium, triethylammonium, n-propylammonium, isopropylammonium, di-n-propylammonium, diisopropylammonium, bis(3-hydroxypropyl)-ammonium, tetramethylammonium and tetraethylammonium. $R^1$ and $R^2$ are hydrogen or lower aliphatic radicals preferably containing up to 10 carbon atoms such as methyl, ethyl, n-propyl, isopropyl, 2-hydroxyethyl, allyl, crotyl, n-butyl, sec-butyl, tert.-butyl, methallyl, 3-hydroxypropyl and 2-hydroxypropyl. $R^3$ may be aliphatic or aromatic such as methyl, ethyl, phenyl or allyl. $R^4$ is a residue of a hydroxy compound obtained by the removal of OH group. Suitable hydroxy compounds include methanol, isopropyl alcohol, sec.-butyl alcohol, amyl alcohol, hexanol, octyl alcohol, heptyl alcohol, lauryl alcohol, tetradecyl alcohol, allyl alcohol, oleyl alcohol, methallyl alcohol, crotyl alcohol, cetyl alcohol, stearyl alcohol, capryl alcohol, polyhydroxy alcohols such as ethylene glycol, polyethylene glycol, trimethylene glycol, ether alcohols of ethylene and alkylene glycols marketed under trade names such as Dowanols and Cellulosolves, aralkyl alcohols such as benzyl and β-phenylethyl alcohol, nitroalcohols such as 2-nitropropanol, 2-nitroethanol, pyridinols, chloropyridinols, acetylenic alcohols such as 2-propargyl alcohol, 2-methyl-3-butynol-2,3-methyl-1-pentynol-3, 3-butyne-1-ol, 2-butyne-1, 4-diol, 2,4-hexadiyne-1,6-diol, 3,6-dimethyl-4-octyne-3,6-diol, and other hydroxy compounds such as dialkylaminoalcohols, 2,4-dichlorophenoxyethanol, 2,4,5-trichlorophenoxyethanol, 2-(2,4-dichlorophenoxy)propanol, 2-(3,4,5-trichlorophenoxy)propanol, phenol, pentachlorophenol, 4,6-dinitro-o-sec.-amylphenol, 4,6 -dinitro-o-sec.-butylphenol, 4,6-dinitro-o-cresol, and mono- and polyhalophenols. Preferred compounds include the lower alkyl esters, monoglycol lower alkyl ether esters and diglycol lower alkyl ether esters wherein glycol is of the ethylene and/or propylene series and lower alkyl contains from 1 to 10 carbon atoms, inclusive. $R^5$ is a divalent alkylene radical containing from 1 to 10 carbon atoms, inclusive, such as methylene, ethylene, propylene, butylene, isobutylene, hexylene or decylene. $R^6$ is an alkyl radical containing from 1 to 10 carbon atoms, inclusive, such as methyl, ethyl, propyl, isopropyl, butyl, hexyl, octyl or decyl.

The 4-amino-3,5,6-trichloro-2(functionally substituted methyl)pyridine compounds of the present invention are white to light gray, beige or yellow crystalline solids or liquids, generally of low to moderate solubility in water and of low to moderate or even high solubility in organic solvents such as acetone, xylene, ethanol, isopropyl alcohol, dimethylformamide and dimethyl sulfoxide.

The compounds of the present invention are useful as pesticides for the control of nematocidal activity in soil and for other pesticidal applications as well. The compounds are also useful for the modification and alteration of the growth of plants and plant parts, and/or for the control of the growth and killing of plants and plant parts.

The products of the present invention where F in Formula I is —OH, and which may be called 4-amino-3,5,6-trichloro-2-pyridinemethanols, can be prepared by the reduction of an appropriate 4-amino-3,5,6-trichloropicolinate as shown in Formulas III and IV. The reduction can be effected by the use of a reducing agent such, for example, as sodium borohydride, lithium borohydride or lithium aluminum hydride, or by refluxing the ester with metallic sodium and an alcohol. Reduction of the ester can also be accomplished by processes of hydrogenation in the presence of copper chromite or other catalyst. Sodium borohydride proves to be a particularly useful reducing agent for the present purpose, however, and the preparations described below in the examples make use of this reagent. Sodium borohydride is soluble in water without decomposition. It is also soluble, though with varying degrees of decomposition, in methanol, ethanol, ethylene diamine, the dimethyl ether of diethylene glycol and the dimethyl ether of triethylene glycol. The reduction of the ester can be effected by dissolving the picolinate starting material in methanol or other solvent for both the ester and the sodium borohydride, and then bringing this solution into contact with an excess of sodium borohydride in either the presence or the absence of water. Good results can be obtained when the borohydride is present in from at least 4X to about 20X the equimolar, stoichiometric requirement. In one method sodium borohydride is added slowly to a solution of methyl 4-amino-3,5,6-trichloropicolinate in methanol. When the initial vigorous reaction subsides, the solution can be heated under reflux conditions for several hours to drive the reaction to completion. In another method, an excess of the sodium borohydride is dissolved in water, together with a small amount of methanol, and this solution is slowly added, over the course of one-half to about 2 hours, to a solution of methyl 4-amino-3,5,6-trichloropicolinate in methanol. A slight temperature rise from the ambient conditions prevailing at the start of the reaction is noted as the sodium borohydride is added. The reaction can then be terminated without the practice of a reflux or other heating step, though the latter can be employed if it is desired to maximize the yield. The desired 4-amino-3,5,6-trichloro-2-pyridinemethanol compound can be separated from the reaction mixture and purified by conventional procedures. For example, said compound can be recovered by distilling off a large portion of the methanol and then inducing precipitation of the desired compound by pouring the mixture over ice water. The crude product can be further purified by crystallization from dichloromethane or other appropriate solvent.

The compounds of the present invention wherein F in Formula I is a halo radical such as chloro, bromo or iodo, for example, can be prepared by reacting the appropriate methanol derivative, (where F is $-CH_2OH$) with a suitable halogen compound. Thus, the chloride derivatives can be prepared by reacting the 4-amino-3,5,6-trichloro-2-pyridinemethanol compound with phosphorous trichloride, phosphorus pentachloride or thionyl chloride. In another method, the methanol derivative can be reacted with concentrated hydrochloric acid in the presence of zinc chloride as an acid activator. When using thionyl chloride as the reagent, for example, good results can be obtained by slowly adding the aminotrichloropyridinemethanol to an excess of thionyl chloride containing a catalytic amount of pyridine hydrochloride. The reaction is exothermic and the reaction mixture is cooled to prevent loss of the thionyl chloride reactant as the latter is being added. With subsequent refluxing for periods of 0.5 to 2 hours the reaction is completed, and the product can be separated from the hydrogen chloride and sulfur dioxide byproducts, as well as from excess thionyl chloride, by a practice of conventional separatory techniques. Bromo and iodo derivatives can be prepared by reacting the methanol derivative starting material with constant boiling hydrobromic or hydroiodic acids. In the preparation of the bromides the yield is increased by conducting the reaction in the presence of sulfuric acid, and the procedure involves the use of either a hydrobromic-sulfuric acid solution or one which is a mixture of aqueous sodium bromide and sulfuric acid. The product may then be recovered and purified according to conventional procedures.

The compounds of this invention which are cyano, or nitrile derivatives are those wherein F in Formula I is $-CN$ or $-OR^5CN$. Those compounds which are acetonitrile derivatives, where F is -CN, can be prepared by reacting the appropriate 4-amino-3,5,6-trichloro-2-(halomethyl)pyridine with an excess of sodium or potassium cyanide in aqueous alcoholic solution. The reaction takes place readily as the reaction mixture is heated under reflux conditions for one-half to 2 or more hours, following which the desired 4-amino-3,5,6-trichloro-2-pyridineacetonitrile compound can be recovered and purified according to conventional procedures. Thus, the by-product alkali metal halide salt can be filtered off and the desired product precipitated out as the filtrate is poured over ice water. Purification is effected by recrystallizing the pyridine acetonitrile compound from benzene or other appropriate solvent. In another method, either the acetonitrile derivative or those wherein F is $-OR^5CN$ can be prepared from the corresponding amide derivative, $-CONH_2$ or $-OR^5CONH_2$, prepared as described in a succeeding paragraph. The nitriles are formed as the amide is reacted with phosphorous pentoxide for several hours at temperatures of 160°C. to 250°C. The reaction is usually conducted under reduced pressures, and the nitrile product can either be continuously distilled off as it is formed or at the end of the reaction.

The compounds of the invention which are free acids, i.e., those wherein F in Formula I is a carboxylic acid group ($-COOH$) or an oxyalkanoic acid group ($-OR^5COOH$) can be prepared as follows. Those wherein F is $-COOH$, and which may be called 4-amino-3,5,6-trichloro-2-pyridine-acetic acid compounds, can be prepared by the hydrolysis of the corresponding nitrile derivative, where F is -CN, prepared as described above. This hydrolysis can be effected by heating the nitrile with an excess of either aqueous acid or base. Suitable strong acids for carrying out the hydrolysis include 50–85 percent sulfuric or hydrochloric acids, while a representative strong base is 65 to 85 percent sodium hydroxide. The reaction takes place readily at temperatures of from about 80°C. to about 180°C. for a period of from 0.25 to 2 hours. If an acid is employed for the hydrolysis, the ammonia formed during the reaction is bound as the acid salt, whereas on alkaline hydrolysis ammonia is liberated and the desired carboxylic acid product is obtained by acidification of the reaction mixture containing the alkali salt. The final product compound can be recovered and purified according to conventional procedures. For example, the product obtained by hydrolysis using aqueous acid is precipitated out as the reaction mixture is poured over ice water. Purification is effected by dissolving the product in dilute caustic and then reprecipitating the same with acid. Those compounds wherein F is $-OR^5COOH$ can be prepared by first reacting the appropriate 4-amino-3,5,6-trichloro-2-methanolpyridine starting material, present in solution in an inert solvent such as tetrahydrofuran, with an excess of sodium hydride to form the corresponding sodium methoxide pyridine derivative, the reaction proceeding under ambient or moderately elevated conditions and being complete in from about one-half to 2 hours. An appropriate $BrR^5COOR^4$, bromoalkanoic acid ester (e.g., $BrCh_2H_5$) is then added to the reaction mixture in approximately stoichiometric proportions. In the ensuing metathetical reaction, which takes place in a matter of one-half to 2 hours at ambient or moderately elevated temperatures, there is formed the ester (e.g., $-OCH_2COOC_2H_5$), together with sodium halogen salt as the by-product of the reaction. This pyridine ester derivative, which corresponds to one wherein F is $-OR^5COOR^4$, can be recovered and purified according to conventional procedures. For example, the salt can be filtered off and the solvent evaporated, leaving a product from which the ester can be extracted with benzene or other solvent. The free acid (e.g., $-OCH_2COOH$ and conforming to one wherein F is $-OR^5COOH$) can then be formed by hydrolysis of the ester. This may be accomplished by dissolving the ester in an alcoholic solvent and adding a dilute base such as aqueous caustic. The reaction proceeds readily at temperatures of 40°C. to 70°C. and is complete in from about one-fourth to 2 hours. Thereafter, the mixture is cooled and acidified to precipitate the desired free acid compound which can then be recovered and purified according to conventional procedures.

The compounds of the present invention which are ethers, i.e., wherein F in Formula I is an oxyaliphatic group, $-OR^1$, can be prepared by mixing together and reacting the appropriate 4-amino-3,5,6-trichloro-2-(chloromethyl)pyridine and an excess of the sodio derivative of the lower aliphatic radical represented by R[1]. For example, when R[1] is —$CH_3$ the reaction can be conducted by first dissolving sodium metal in methanol and then adding the resulting solution to a solution of the pyridine starting material in methanol. The reaction takes place readily as the reaction mixture is heated to from about 60°C. to 120°C., under reflux conditions, for one-half to about 10 hours, following which the desired product, here the 2-(methoxymethyl)pyridine derivative, can be recovered and purified according to conventional procedures. For example, the solution can be filtered when hot to remove the salt byproduct, following which the product can be obtained and recovered in solid form as the filtrate is poured over ice water to precipitate the desired product. The latter may be recovered by filtration or it may be extracted from the aqueous mixture with a water-immiscible organic solvent, in which event the product is then recovered by distilling off the solvent.

The compounds hereof which are amines or aminooxyaliphatic derivatives, i.e., those wherein F in Formula I is —$NR^1R^2$ or —$OR^5NR^1R^2$, can be prepared from the appropriate 4-amino-3,5,6-trichloro-2-(chloromethyl)pyridine compound, prepared as described above. In the case of those wherein F is —$NR^1R^2$, the amine can be prepared by mixing together and reacting a stoichiometric excess of the appropriate amino compound, $HNR^1R^2$, and the appropriate 4-amino-3,5,6-trichloro-2-(halomethyl)pyridine starting material, prepared as described above, at a temperature in the range of from about 15° to 100°C. When the amino compound reactant is ammonia or other gaseous or low boiling amine, the reaction is preferably carried out in a sealed vessel at autogenous pressure. with other nitrogen bases, the reaction is preferably carried out at the reflux temperature of the base or of any solvent such as methanol, ethanol, isopropyl alcohol, toluene, or the like, which may be employed. At the end of the reaction period, which may last, for example, for one-half to 2 or more hours, the desired amination product compound can be recovered and purified according to conventional procedures. For example, the crude product can be washed with hot water to remove the salt by-product, and then further purified by recrystallization from a solvent. Those amines wherein F is —$OR^5NR^1R^2$ can be prepared by reacting the appropriate 4-amino-3,5,6-trichloro-2-(chloromethyl)pyridine compound with the sodium salt of an appropriate hydroxyamine (e.g., ethanolamine or diethyl ethanolamine) having the formula $NaOR^5NR^1R^2$. This reaction is conducted in the same fashion as that described above for the preparation of those compounds wherein F is —$OR^1$.

The products of the invention which are aminotrichloropyridine esters, i.e., compounds wherein F in Formula I is —$COOR^4$, —$OR^5COOR^4$, or an oxyalkanoyl group, —$OC(O)R^6$, can be prepared by reacting and/or esterifying appropriate carboxylic acid and hydroxy compounds with one another. In the case of the ester groups —$COOR^4$ and —$OR^5COOR^4$, the hydroxy compound is one having the formula $R^4OH$ and the pyridine carboxylic acid reactant is one of the type described above wherein the substituent in the 2- position of the 4-amino-3,5,6-trichloropyridine reactant is either —$CH_2COOH$ or —$CH_2OR^5COOH$. On the other hand, when the ester group to be formed is one wherein F in Formula I is —$OC(O)R^6$, the hydroxy reactant is a 4-amino-3,5,6-trichloro-2-pyridinemethanol compound and the acid is one having the formula $R^6COOH$ or an anhydride of said acid. Another method for preparing esters wherein F is —$OR^5COOR^4$ is described above in connection with the preparation of the acids where F is —$OR^5COOH$.

When $R^4OH$ is alkanol or aralkanol containing from about 1 to about 10 or to about 16 carbon atoms, the reaction is preferably carried out in the presence of an esterification catalyst. The ester can be prepared by mixing the acid and alcohol reactants together in the presence of an acid catalyst, whereupon a reaction takes place with the formation of the desired aminotrichloropyridine ester product. Gaseous hydrogen chloride is conveniently employed as a catalyst, although other esterification catalysts such as sulfuric acid, nitric acid, phosphoric acid, p-toluenesulfonic acid and oxalic acid may be employed. With lower boiling $R^4OH$ alcohols, excess alcohol may be employed to serve as reaction medium. With higher boiling alcohols, an inert solvent such as benzene or xylene may be employed. The reaction takes place readily at temperatures in the range of from about 10°C. to about 150°C. or the boiling point of alcohol reactant or solvent. The amounts of the reactants are not critical but the reaction is facilitated by employing a stoichiometric excess of alcohol. The time is not critical and depends to some extent on the reaction temperature. In a preferred method for carrying out the reaction, the appropriate pyridine carboxylic acid compound and the appropriate hydroxy compound are mixed together and gaseous hydrogen chloride added thereto while maintaining the temperature below about 20°C. until the reaction mixture is saturated with hydrogen chloride. The mixture is then allowed to warm to room temperature and kept at room temperature for several hours, conveniently overnight. Thereafter, the unreacted alcohol and hydrogen chloride are removed by vaporization and the desired 4-aminotrichloropyridine ester product is recovered by conventional procedures.

Certain ester compounds such as those derived from hydroxy compounds wherein $R^4OH$ is an alkenyl, alkynyl or aralkyl alcohol, are preferably prepared by another procedure wherein a salt, preferably an alkali metal salt of the pyridine carboxylic acid starting compound, is reacted with a halide corresponding to the alcohol to produce the ester product. Substantially stoichiometric amounts of the reactants are employed and the reaction is preferably carried out in an inert solvent such as dimethylformamide or dimethyl sulfoxide at temperatures in a range of from about 60°C. to about 160°C. In conducting the reaction, the appropriate alkenyl, alkynyl or aralkyl halide is added slowly to a warm solution of alkali metal salt of the pyridine carboxylic acid starting compound and the mixture thereafter maintained at reaction temperatures for several hours to obtain the desired ester product. The latter may be obtained from the reaction mixture by pouring the mixture into water to precipitate the ester product which can be recovered by filtration and purified, if desired, by conventional procedures.

The ester compounds of the present invention derived from $R^4OH$ hydroxy compounds which are phenols, pyridinols, polyglycol ether alcohols, dialkylaminoalkanols, and higher molecular weight alcohols, may be prepared from the corresponding acid chloride and appropriate hydroxy compound in the presence of a tertiary amine to produce the desired ester product and hydrogen chloride byproduct. In carrying out preparation of the esters according to this method, the acid chloride can be prepared as the first step of the reaction by warming together on a steam bath the pyridine carboxylic acid starting compound with a stoichiometric excess of thionyl chloride. The heating process is continued until the reaction is complete as evidenced by the cessation in the evolution of the byproduct gases, hydrogen chloride and sulfur dioxide. The mixture is then subjected to reduced pressure to remove the excess thionyl chloride and to recover the acid chloride compound which is then used in the second step of the reaction to react with the appropriate hydroxy compound. The exact amounts of the reactants are not critical, some product being obtained in any case; usually stoichiometric amounts of the reactants are employed. A large excess of water-miscible tertiary amine conveniently is used, the tertiary amine functioning not only to promote the reaction but also to act as a solvent medium. The tertiary amine also reacts with the hydrogen chloride byproduct to form the tertiary amine hydrochloride salt. Suitable tertiary amines include pyridine, picoline, trimethylamine and triethylamine. Supplemental solvents such as benzene or xylene may also be employed. The appropriate hydroxy compound is dissolved in excess tertiary amine base and thereafter the acid chloride compound, usually in benzene solution, is added portionwise thereto. The mixture is allowed to react at a temperature in the range of from room temperature to the boiling point of the solvent for from about 1 hour to 10 hours. The product may be isolated from the reaction mixture by pouring the mixture into cold water or into a cold, dilute, aqueous alkali metal bicarbonate solution, the desired ester compound being thus obtained as a precipitate in either case. The product can then be recovered from the mixture by conventional procedures such as by filtration or by extraction with a water-immiscible organic solvent.

In preparing esters of the type wherein F in Formula I is —OC(O)R⁶, the appropriate 4-amino-3,5,6-trichloro-2-pyridinemethanol compound is reacted with an acid having the formula R⁶COOH, the term acid as here employed including both the acid as well as the anhydride thereof. The reaction will proceed in the absence of a catalyst as, for example, when employing acetic anhydride as the acid reactant; however, advantage is preferably taken of the accelerating action of a small amount of concentrated sulfuric acid, hydrogen chloride, boron fluoride or a basic catalyst such as sodium acetate or pyridine. Excess acid may be employed to serve as reaction medium, though other solvents can also be employed, if desired. The reaction takes place readily at temperatures in the range of from about 10°C to about 225°C, or the boiling point of the acid or acid anhydride being employed. The reactant proportions are not critical but the presence of excess acid is preferred. Similarly, the reaction time is not critical and depends to some extent on the reaction temperature. In a preferred method for carrying out the reaction, the appropriate acid or acid anhydride is added in excess to a 4-amino-3,5,6-trichloro-2-pyridinemethanol, either with or without the addition of a catalyst. The mixture is refluxed for a period of 0.5 to 5 or more hours. The ester can then be recovered as a solid from the reaction mixture, after which it can be recrystallized from mixed benzene and hexane solvent and/or be otherwise purified by conventional methods.

The products of the present invention which are salts, i.e., compounds wherein F in Formula I is —COOM or —OR⁵COOM, can be prepared by the reaction of the appropriate 4-amino-3,5,6-trichloropyridine compound, wherein F is —COOH or —OR⁵COOH, with the appropriate metal or ammonium or quaternary ammonium hydroxide or amine, including the lower alkylamines and lower alkanolamines wherein each lower alkyl and lower alkanol contains from 1 to 10 carbon atoms. In carrying out the reaction, substantially equivalent or stoichiometric proportions of the acid and base are mixed together in a suitable solvent such as alcohol-water whereupon a reaction takes place with the formation of the desired salt product and water byproduct. The salt may or may not be soluble in the reaction medium. If insoluble, it may be recovered by filtration; if soluble, it may be recovered by vaporizing off the solvent and water. The salt may be purified, if desired, by conventional methods.

Salts of metals which form difficultly soluble hydroxides, such as copper, may be prepared by an alternative procedure wherein an alkali metal salt of the 4-amino-3,5,6-trichloropyridine carboxylic acid compound is reacted with a soluble mineral acid salt of said metal, such as chloride or nitrate to produce the desired metal salts. In such preparation, substantially equivalent proportions of the pyridine carboxylic acid alkali metal salt and said metal salt of mineral acid are stirred together in water or water-alcohol solvent at room temperature or with gentle warming for from 1/2 to several hours, whereupon the desired metal salt of the 4-amino-3,5,6-trichloropyridine acid compound usually precipitates in the reaction mixture. The latter may be recovered by filtration and purified, if desired, by conventional procedures.

The products of the present invention which are amides, i.e., compounds wherein F in Formula I is —CONR¹R² or —OR⁵CONR¹R², or which are hydrazides, i.e., compounds wherein F is —CONHNHR³ or —OR⁵CONHNHR³, can be prepared by reacting an appropriate lower alkyl ester of the corresponding aminotrichloropyridine carboxylic acid compound with an appropriate nitrogen base. Thus, the amides can be prepared by reacting the ester with ammonia or an amine, R¹R²NH. The hydrazides can be prepared by reacting the ester with hydrazine or substituted hydrazine, R³NHNH₂. The reaction takes place smoothly and is completed in a few minutes as the mixed reactants, in an aqueous or alcoholic solvent, are heated at reflux temperatures. The amounts of the reactants are not critical, though an excess of the ammonia, amine or hydrazine reactant is desirable. The product can be obtained as a residue by distilling off the more volatile constituents of the reaction mixture, or the latter can be poured into cold water to precipitate the amide or hydrazide. The product can then be further purified by conventional procedures.

Those compounds of the present invention which are carbamate derivatives, i.e., those wherein F in Formula I is —OCONR¹R², can be prepared from the corresponding 4-amino-3,5,6-trichloro-2-pyridinemethanol compound. Thus, those wherein R¹ and R² are lower aliphatic radicals can be prepared by reacting the pyridinemethanol compound with equimolar amounts of the appropriate carbamyl chloride, R¹R²NCOCl, to form the desired carbamate along with hydrogen chloride as byproduct. The reaction takes place at about 60° to 120°C., in the presence of a solvent such as toluene or xylene, and a solution of the carbamyl chloride in the solvent is preferably added slowly to the reaction mixture. The reaction is complete in from about one-half to 2 hours, after which the solution can be cooled and poured over ice water. On being neutralized with caustic, the desired carbamate product comes down as a solid and can be recovered and purified by conventional procedures.

In another method of preparation, those carbamate products wherein one or both of $R^1$ and $R^2$ are hydrogen or lower aliphatic radical can be prepared by first converting the pyridine methanol compound to a chloroformate derivative, where F is —OCOCl, thus providing another 2- functionally substituted methyl derivative coming within the scope of this invention. The chloroformate is then reacted with either ammonia or with a primary or secondary amine to form the desired carbamate product and hydrogen chloride as byproduct. The first of these reactions is conducted by slowly adding stoichiometric amounts of phosgene to a solution of the pyridinemethanol starting material in benzene or toluene at about 0° to 15°C., the solution preferably containing dimethyl aniline or other tertiary amine as catalyst. At the end of the addition period, or within a relatively short time thereafter, the chloroformate product can be recovered, if desired, by distilling off the solvent under vacuum. The product can then be reacted with the nitrogen compound. Alternatively, the solvent is not distilled off and the carbamate is formed by adding ammonia or the appropriate primary or secondary amine to the solution at ambient temperatures. This reagent is normally added in slight excess so as to provide an acceptor for the hydrogen chloride byproduct. Following the addition of the nitrogen compound, the solution may be refluxed for a short time to finish out the reaction, following which it can be cooled and poured over ice water to precipitate out the desired carbamate product which can then be recovered and purified by known methods.

The compounds of the present invention may be prepared by adaptations of procedures known to the skilled in the art. Thus, it is to be understood that modifications or other methods known in the art for preparation of compounds having similar (F) functional groups may be substituted for the above procedures.

DETAILED DESCRIPTION OF THE INVENTION

The following examples illustrate the invention but are not to be construed as limiting.

EXAMPLE 1.

4-amino-3,5,6-trichloro-2-pyridinemethanol

In this operation a solution of 141 grams (3.9 moles) of sodium borohydride in 350 ml. water and 100 ml. methanol was added slowly over the course of 1 hour to a solution of 100 grams (0.392 mole) or methyl 2-amino-3,4,5-trichloropicolinate in 2400 ml. of methanol. The reaction mixture was stirred vigorously as the sodium borohydride was added and the solution experienced a temperature rise of approximately 5°C. during this addition period. The mixture was then heated to 75°C. to distill off the methanol, after which it was cooled and poured over ice water. The product came down in the form of a brown solid. This solid was filtered off, taken up in dichloromethane, and recrystallized therefrom. The product, 4-amino-3,5,6-trichloro-2-pyridinemethanol, is recovered in 88 percent yield as a light beige crystalline material having a melting point of 148°–149°C. It has low solubility in water and benzene, and moderate solubility in acetone. It is identified by infrared spectra and elemental analysis, the latter showing carbon, hydrogen, chlorine and nitrogen contents of 31.55, 2.42, 44.82 and 11.98 percent, respectively, as against theoretical values of 32.0, 2.2, 47.2 and 12.4 percent.

EXAMPLE 2

In a fashion similar to that described in Example 1, the following compounds are prepared by reacting the indicated starting compound with excess sodium borohydride in methanol:

4-dimethylamino-3,5,6-trichloro-2-pyridinemethanol having a molecular weight of 255.5 from methyl 3,5,6-trichloropicolinate.

4-methylamino-3,5,6-trichloro-2-pyridinemethanol having a molecular weight of 241.5 from n-propyl 4-methylamino-3,5,6-trichloropicolinate.

4-diethylamino-3,5,6-trichloro-2-pyridinemethanol having a molecular weight of 283.5 from ethyl 4-diethylamino-3,5,6-trichloropicolinate.

4-morpholino-3,5,6-trichloro-2-pyridinemethanol having a molecular weight of 298.5 from isopropyl 4-morpholino-3,5,6-trichloropicolinate.

4-piperidino-3,5,6-trichloro-2-pyridinemethanol having a molecular weight of 296.5 from secondary-butyl 4-piperidino-3,5,6-trichloropicolinate.

4-di(normal-butyl)amino-3,5,6-trichloro-2-pyridinemethanol having a molecular weight of 339.5 from methyl 4-di(normal-butyl)amino-3,5,6-trichloropicolinate.

4-tertiary-butylamino-3,5,6-trichloro-2-pyridinemethanol having a molecular weight of 283.5 from methyl 4-tertiary-butylamino-3,5,6-trichloropicolinate.

4-hydrazino-3,5,6-trichloro-2-picolinemethanol having a molecular weight of 243.6 from methyl 4-hydrazino-3,5,6-trichloropicolinate.

4-(4-pentenyl)amino-3,5,6-trichloro-2-pyridinemethanol having a molecular weight of 295.5 from methyl 4-(4-pentenyl)amino-3,5,6-trichloropicolinate.

4-n-hexadecylamino-3,5,6-trichloro-2-pyridinemethanol having a molecular weight of 451.5 from methyl 4-n-hexadecylamino-3,5,6-trichloropicolinate.

4-(4-methylbenzyl)amino-3,5,6-trichloro-2-pyridinemethanol having a molecular weight of 332.5 from ethyl 4-(4-methylbenzyl)amino-3,5,6-trichloropicolinate.

4-(2-hydroxyethyl)amino-3,5,6-trichloro-2-pyridinemethanol having a molecular weight of 317.5 from methyl 4-(2-hydroxyethyl)amino-3,5,6-trichloropicolinate.

4-(bis(2-hydroxypropyl))amino-3,5,6-trichloro-2-pyridinemethanol having a molecular weight of 343.5 from methyl 4-(bis(2-hydroxypropyl))amino-3,5,6-trichloropicolinate.

4,4'-ethylenediimino-bis(3,5,6-trichloro-2-pyridinemethanol) having a molecular weight of 481 from methyl 4,4'-ethylenediimino-bis(3,5,6-trichloropicolinate).

4,4'-hydrazo-bis(3,5,6-trichloro-2-pyridinemethanol) having a molecular weight of 453 from methyl 4,4'-hydrazo-bis(3,5,6-trichloropicolinate).

4,4'-piperazine-bis(3,5,6-trichloro-2-pyridinemethanol) having a molecular weight of 509 from methyl 4,4'-piperazine-bis(3,5,6-trichloropicolinate).

EXAMPLE 3

4-amino-3,5,6-trichloro-2-(chloromethyl)-pyridine

Twenty grams (0.089 mole) of 4-amino-3,5,6-trichloro-2-pyridinemethanol were slowly added over the course of about 30 minutes to 250 ml. (2.1 moles) of thionyl chloride containing approximately 1 gram of pyridine hydrochloride as catalyst. The solution was rapidly stirred during the addition of the pyridinemethanol compound while also being cooled to maintain the temperature at a level of about 30°C.–40°C. The solution was then refluxed for 1 hour, and during which period most of the thionyl chloride was lost by evaporation. The remaining liquid was poured over ice water, and the solid product which separated out was taken up in hexane and recrystallized therefrom. The product, 4-amino-3,5,6-trichloro-2-(chloromethyl)pyridine, was recovered in a yield of 54.5 percent as a yellow solid having a melting point of 155°–157°C. It had low solubility in water and good solubility in acetone and benzene. It was identified by infrared spectra and elemental analysis, the latter showing carbon, hydrogen, chlorine and nitrogen contents of 28.98, 1.59, 57.38 and 11.38 percent, respectively, as against theoretical values of 29.2, 1.63, 57.7 and 11.4 percent.

EXAMPLE 4

4-amino-3,5,6-trichloro-2-(aminomethyl)pyridine

Five grams (0.02 mole) of 4-amino-3,5,6-trichloro-2-(chloromethyl)-pyridine were placed in a pressure vessel which was then charged with an excess of ammonia gas. The vessel was sealed and heated for 1 hour at 90°C. The product was removed from the vessel, washed with hot water to remove ammonium chloride, and then recrystallized from a mixed benzene-hexene solvent. The product, 4-amino-3,5,6-trichloro-2-(aminomethyl)-pyridine, was recovered in 88 percent yield as a light beige solid having a melting point of 158°–160°C. it has low solubility in water and low to medium solubility in benzene and acetone. It is identified by infrared spectra and elemental analysis, the latter showing carbon, hydrogen, chlorine and nitrogen contents of 32.09, 2.55, 46.82 and 18.19 percent, respectively, as against theoretical values of 31.8, 2.65, 47.0 and 18.5 percent.

EXAMPLE 5

4-amino-3,5,6-trichloro-2(ethylaminomethyl)-pyridine ((4-amino-3,5,6-trichloro-2-pyridyl)methoxy)-triethylamine 4-amino-3,5,6-trichloro-2-(chloromethyl)pyridine in methanol is reacted with ethylamine added in excess. The solution is refluxed for 1 hour, after which the solvent is distilled off. The desired 4-amino-3,5,6-trichloro-2(ethylaminomethyl)-pyridine compound having a molecular weight of 254.5 is recovered by washing with hot water and recrystallization from mixed benzene-hexane.

In a fashion similar to that described in the preceding paragraph, ((4-amino-3,5,6-trichloro-2-pyridyl)methoxy)-triethylamine, having a molecular weight of 326.5, is prepared from 4-amino-3,5,6-trichloro-(2-chloromethyl)-pyridine and the sodium salt of diethyl ethanolamine.

EXAMPLE 6

4-amino-3,5,6-trichloro-2-pyridineacetonitrile 4-amino-3,5,6-trichloro-2(chloromethyl)-pyridine (15. g., 0.061 mole) in 30 ml. ethanol was added to a warm solution of sodium cyanide (3.5 g., 0.075 mole) in 30 ml. of water. The mixture was refluxed for 1½ hours, at which time some solid (NaCl) started coming out of the homogenous mixture. After filtering off the salt the product was poured over ice water to precipitate the desired pyridineacetonitrile product, the latter then being recovered and recrystallized from benzene in 81.2 percent yield. This compound was a light beige solid having a melting point of 168° – 170°C. It has low solubility in water and good solubility in benzene and acetone. Elemental and infrared anlysis confirm the product to be 4-amino-3,5,6-trichloro-2-pyridineacetonitrile, the carbon, hydrogen, chlorine and nitrogen contents having been found to be 35.4, 1.86, 44.98 and 17.82 percent, respectively, as against theoretical values of 35.6, 1.69, 45 and 17.8 percent.

EXAMPLE 7

In operations similar to that described in Example 6, the following compounds are prepared from chloromethyl pyridines prepared by the method described in Example 3:

4-methylamino-3,5,6-trichloro-2-pyridineacetonitrile having a molecular weight of 250.5 by the reaction of 4-methylamino-3,5,6-trichloro-2-(chloromethyl)-pyridine with sodium cyanide.

4-(2-hydroxyethyl)amino-3,5,6-trichloro-2-pyridineacetonitrile having a molecular weight of 280.5 by the reaction of 4-(2-hydroxyethyl)amino-3,5,6-trichloro-2-(chloromethyl)-pyridine with sodium cyanide.

4-tertiary-butylamino-3,5,6-trichloro-2-pyridineacetonitrile having a molecular weight of 292.5 by the reaction of 4-tertiary butyl-3,5,6-trichloro-2-(chloromethyl)-pyridine with sodium cyanide.

EXAMPLE 8

4-amino-3,5,6-trichloro-2-pyridineacetic acid 85 ml. of 80 percent aqueous sulfuric acid were added to 4-amino-3,5,6-trichloro-2-pyridineacetonitrile (5 g., 0.02 mole) and stirred at 120° – 130°C. for 1 hour. The mixture was then poured over ice water and neutralized with sodium hydroxide solution. The acid was dissolved in dilute sodium hydroxide and reacidified with hydrochloride, thus precipitating out, in 87 percent yield, the desired 4-amino-3,5,6-trichloro-2-pyridineacetic acid product. The latter is a white solid having a melting point of 194°–195°C. which is slightly soluble in water and has low to good solubility in benzene and acetone. Elemental analysis of this compound disclosed carbon, hydrogen, chlorine, nitrogen and oxygen contents of 31.9, 1.9, 40.7, 10.6 and 14.9 percent, respectively, as compared to theoretical values of 32.9, 1.96, 41.6, 11.0 and 12.5 percent.

EXAMPLE 9

In operations similar to that described in Example 8, the following compounds are prepared from pyridineacetonitriles prepared by the method described in Example 6:

4-methylamino-3,5,6-trichloro-2-pyridineacetic acid having a molecular weight of 269.5 by the reaction of sulfuric acid and 4-methylamino-3,5,6-trichloro-2-pyridineacetonitrile.

4-diethylamino-3,5,6-trichloro-2-pyridineacetic acid having a molecular weight of 311.5 by the reaction of sulfuric acid and 4-diethylamino-3,5,6-trichloro-2-pyridineacetonitrile.

4-diisopropylamino-3,5,6-trichloro-2-pyridineacetic acid having a molecular weight of 339.5 by the reaction of sulfuric acid and 4-diisopropylamino-3,5,6-trichloro-2-pyridineacetonitrile.

4-piperidino-3,5,6-trichloro-2-pyridineacetic acid having a molecular weight of 323.5 by the reaction of sulfuric acid with 4-piperidino-3,5,6-trichloro-2-pyridineacetonitrile.

4-morpholino-3,5,6-trichloro-2-pyridineacetic acid having a molecular weight of 325.5 by the reaction of sulfuric acid with 4-morpholino-3,5,6-trichloro-2-pyridineacetonitrile.

EXAMPLE 10

((4-amino-3,5,6-trichloro-2-pyridyl)methoxy)-acetic acid ethyl ester of ((4-amino-3,5,6-trichloro-2-pyridyl)methoxy)-acetic acid Sodium hydride, 50 percent in oil, (1.2 g., 0.05 mole) in 60 ml. tetrahydrofuran was added to 4-amino-3,5,6-trichloro-2-pyridinemethanol in 30 ml. tetrahydrofuran. After stirring the mixture at room temperature for 1 hour, ethyl bromoacetate (4.2 g., 0.025 mole) was added to the reaction mixture. In 1 hour the NaBr salt which had formed was filtered off. Some of the solvent was then evaporated under vacuum and about 3 ml. water was added, after which the balance of the solvent was evaporated off at ambient pressures. The oily ester product was extracted with benzene. It was identified by infrared and elemental analysis as the ethyl ester of ((4-amino-3,5,6-trichloro-2-pyridyl)methoxy)-acetic acid. The elemental analysis disclosed carbon, hydrogen, chlorine, nitrogen and oxygen contents of 39.3, 3.7, 31.9, 8.7 and 16.4 percent, respectively, as compared with theoretical values of 38.5, 3.5, 34, 8.94 and 15.1 percent.

The ester product so identified was dissolved in alcohol and warmed to 45°C. To this solution was added an aqueous 10 percent solution of sodium hydroxide. In one-half hour the mixture was poured over ice water, acidified, and the desired product filtered off as a solid. This product was identified by infrared and elemental analysis as ((4-amino-3,5,6-trichloro-2-pyridyl)methoxy)-acetic acid. Elemental analysis disclosed carbon, hydrogen, chlorine, nitrogen and oxygen contents of 30.7, 2.7, 34.4, 9.3 and 22.9 percent, respectively, as against theoretical values of 31.7, 2.97, 35.2, 9.24 and 21.0 percent. This acid was a white solid melting at 148° – 152°C. with some decomposition. It had low solubility in water, acetone and benzene.

EXAMPLE 11

Sodium salt of 4-amino-3,5,6-trichloro-2-pyridineacetic acid 4-amino-3,5,6-trichloro-2-pyridineacetic acid (2.56 g., 0.01 mole) is added to an aqueous solution of 0.4g. of sodium hydroxide in 20 ml. of 50 percent aqueous ethanol. The resulting mixture is heated at reflux temperatures until a homogenous solution is obtained. The solution is then distilled under reduced pressure to remove the water and ethanol leaving as residue the desired sodium salt of 4-amino-3,5,6-trichloro-2-pyridineacetic acid having a molecular weight of 277.5.

EXAMPLE 12

In a manner similar to that described in Example 11, the following compounds are prepared.

Potassium salt of 4-diethylamino-3,5,6-trichloro-2-pyridine acetic acid having a molecular weight of 349.5 by the reaction of 4-diethylamino-3,5,6-trichloro-2-pyridine acetic acid and potassium hydroxide.

Ammonium salt of 4-piperdino-3,5,6-trichloro-2-pyridineacetic acid, having a molecular weight of 340.5, by the reaction of 4-piperidino-3,5,6-trichloro-2-pyridineacetic acid and ammonium hydroxide.

Sodium salt of ((4-amino-3,5,6-trichloro-2-pyridyl)methoxy)-acetic acid having a molecular weight of 307.5 by the reaction of ((4-amino-3,5,6-trichloro-2-pyridyl)methoxy)-acetic acid and sodium hydroxide.

EXAMPLE 13

(4-amino-3,5,6-trichloro-2-pyridyl)-methyl ester acetic acid

In this operation 100 ml. of acetic anhydride (0.98 mole) were added to 10 grams (0.044 mole) of 4-amino-3,5,6-trichloro-2-pyridinemethanol. The resulting mixture was refluxed for 1.5 hours during which period the desired methyl ester product separated out as a solid. This solid was recovered by filtration, following which it was dissolved in a mixed benzene-hexane solvent and recrystallized therefrom. The product, (4-amino-3,5,6-trichloro-2-pyridyl)-methyl ester of acetic acid was recovered in 74.5 percent yield as a white solid having a melting point of 126° – 128°C. It has low solubility in water and medium to high solubility in benzene and acetone. It was identified by infrared spectra and elemental analysis, the latter showing carbon, hydrogen, chlorine, nitrogen and oxygen contents of 35.87, 2.68, 39.58, 10.48 and 11.39 percent, respectively, as against theoretical values of 35.6, 2.6, 39.4, 10.4 and 11.9 percent.

EXAMPLE 14

4-amino-3,5,6-trichloro-2-(methoxymethyl)-pyridine

Sodium metal (0.7 g., 0.03 mole) was dissolved in 25 ml. methanol and added to 4-amino-3,5,6-trichloro-2-(chloromethyl)-pyridine in 75 ml. methanol. The mixture was refluxed for 3 hours and then filtered to remove salt. The product was precipiated out by pouring the filtrate over ice water. The product, recovered in 87 percent yield, is a beige solid melting at 132° – 134°C. which is slightly soluble in water and highly soluble in acetone and benzene. The product was identified as 4-amino-3,5,6-trichloro-2-(methoxymethyl)-pyridine by infrared and elemental analysis, the latter disclosing carbon, hydrogen, chlorine, nitrogen and oxygen contents of 34.98, 3.76, 44.04, 11.7 and 5.52 percent, respectively, as against theoretical values of 34.8, 2.46, 44.0, 11.6 and 6.66 percent.

EXAMPLE 15

((4-amino-3,5,6-trichloro-2-pyridyl)methoxy)-acetonitrile ((4-amino-3,5,6-trichloro-2-pyridyl)methoxy)-acetamide (9.39g., 0.033 mole) and phosphorous pentoxide (6.5 g., 0.046 mole) are mixed together and then heated to about 235°C. for 3 hours. The reaction mixture is then distilled to recover as distillate a ((4-amino-3,5,6-trichloro-2-pyridyl)methoxy)-acetonitrile product having a molecular weight of 266.5.

EXAMPLE 16 methyl ester of 4-amino-3,5,6-trichloro-2-pyridineacetic acid 4-amino-3,5,6-trichloro-2-pyridineacetic acid (10.22 g., 0.04 mole) is dissolved in 100 ml. of anhydrous methanol, and hydrogen chloride gas is introduced into the solution at 25°C. until the solution becomes saturated with the gas. The reaction mixture is allowed to stand for 12 hours after which approximately three-fourths of the methanol is distilled off under vacuum. Water is then added to precipitate the desired methyl ester of 4-amino-3,5,6-trichloro-2-pyridineacetic acid. This ester is then recrystallized from benzene to obtain a purified product haivng a molecular weight of 314.5.

EXAMPLE 17

In a manner similar to that described in Example 16, and employing acids prepared in a manner described in Examples 8, 9 and 10, the following ester compounds are pprepared:

Methyl ester of 4-methylamino-3,5,6-trichloro-2-pyridineacetic acid having a molecular weight of 328.5 by the reaction of said acid with methanol.

n-Propyl ester of 4-piperidino-3,5,6-trichloro-2-pyridineacetic acid having a molecular weight of 365.5 by the reaction of said acid with n-propyl alcohol.

Methyl ester of ((4-amino-3,5,6-trichloro-2-pyridyl)methoxy)-acetic acid having a molecular weight of 301.5 by the reaction of said acid with methanol.

EXAMPLE 18 phenyl ester of 4-amino-3,5,6-trichloro-2-pyridineacetic acid 4-amino-3,5,6-trichloro-2-pyridineacetic acid (15 g., 0.059 mole) and 70 ml. of thionyl chloride are mixed together and heated at reflux temperatures for 2 hours. The excess thionyl chloride is then removed under aspirator vacuum leaving a solid residue which is recrystallized from benzenehexane to obtain the desired 4-amino-3,5,6-trichloro-2-pyridineacetyl chloride intermediate recovered in the amount of 0.041 mole. This residue is then dissolved in 20 ml. of dry benzene and added over a 10 minute period to a stirred solution of phenol (3.9 g., 0.041 mole) in 9 g. of pyridine. The stirring is continued for one-half hour to obtain the desired product which, on being purified by recrystallization from benzene-hexane is found to be the phenyl ester of 4-amino-3,5,6-trichloro-2-pyridine acetic acid having a molecular weight of 331.5.

EXAMPLE 19

In a manner similar to that described in the preceding example, the appropriate acid is reacted with thionyl chloride to produce the corresponding acid chloride and the latter is thereafter reacted in pyridine with the indicated hydroxy compound to produce the following esters:

2-nitroethyl ester of 4-amino-3,5,6-trichloro-2-pyridineacetic acid, having a molecular weight of 329.5, by the reaction of 2-nitroethanol with the corresponding pyridineacetyl chloride.

Iso-octyl ester of 4-iso-octylamino-2-pyridineacetic acid, having a molecular weight of 478.5, by the reaction of iso-octanol with the corresponding pyridineacetyl chloride.

Benzyl ester of 4-amino-3,5,6-trichloro-2-pyridineacetic acid, having a molecular weight of 345.5, by the reaction of benzyl alcohol with the corresponding pyridineacetyl chloride.

2,4-dichlorophenoxyethyl ester of 4-amino-3,5,6-trichloro-2-pyridineacetic acid, having a molecular weight of 375.5, by the reaction of 2,4-dichlorophenoxyethanol with the corresponding pyridineacetyl chloride.

Oleyl ester of 4-methylhydrazino-3,5,6-trichloro-2-pyridineacetic acid, having a molecular weight of 536.5, by the reaction of oleyl alcohol with the corresponding pyridineacetyl chloride.

EXAMPLE 20

(4-amino-3,5,6-trichloro-2-pyridyl)-methyl ester of methyl carbamic acid a. 400 ml. of dry benzene containing 4 ml. of triethylamine was added to 4-amino-3,5,6-trichloro-2-pyridinemethanol (10 g., 0.0445 mole), and methyl isocyanate was then added to the mixture with stirring. The stirring was continued for several hours, after which the mixture was poured over ice water to precipitate the carbamate product. The latter was recrystallized from benzene-hexane and recovered as a white solid, melting at 204° – 206°C., which has low solubility in water and medium to high solubility in benzene and acetone. Infrared and elemental analysis identified the product as the (4-amino-3,5,6-trichloro-2-pyridyl)-methyl ester of methyl carbamic acid. The carbon, hydrogen, chlorine, nitrogen and oxygen contents were found to be 34.01, 2.85, 37.3, 14.76 and 11.0 percent, respectively, as against theoretical values of 33.9, 2.47, 37.6, 14.8 and 11.23 percent.

b. In another method for preparing this compound, 10 g. (0.044 mole) of the 4-amino-b 3,5,6-trichloro-2-pyridinemethanol starting material is dissolved in 200 ml. of benzene along with a catalytic amount of dimethyl aniline. Phosgene (4.4 g., 0.044 mole), dissolved in benzene, is then slowly added to the solution maintained at 10°C., the solution being stirred during the addition of phosgene and for a one-half hour period thereafter as the mixture comes to room temperature. The (4-amino-3,5,6-trichloro-2-pyridyl)-methyl chloroformate formed in this first step is then present in the solution. Methylamine (3.1 g., 0.1 mole) in benzene is then slowly added to the chloroformate solution, with stirring, followed by a refluxing period of approximately one-half hour. The solution is then cooled and poured over ice water to precipitate out the desired (4-amino-3,5,6-trichloro-2-pyridyl)-methyl ester of methyl carbamic acid. On being filtered off and recrystallized from mixed benzene-hexane, it is found that the product so obtained is identical to that formed by the method of the preceding paragraph.

EXAMPLE 21

In a manner similar to that described in Example 20(b), the following carbamic acid ester compounds are prepared:

(4-amino-3,5,6-trichloro-2-pyridyl)-methyl ester of diethyl carbamic acid, having a molecular weight of 326.5, by the reaction of (4-amino-3,5,6-trichloro-2-pyridyl)methyl chloroformate with diethylamine.

(4-dimethylamino-3,5,6-trichloro-2-pyridyl)-methyl ester of carbamic acid, having a molecular weight of 298.5, by the reaction of (4-dimethylamino-3,5,6-trichloro-2-pyridyl)-methyl chloroformate with ammonia.

EXAMPLE 22

4-amino-3,5,6-trichloro-2-pyridineacetamide 40 ml. of concentrated ammonium hydroxide and 9.45 g. (0.03 mole) of the methyl ester of 4-amino-3,5,6-trichloro-2-pyridineacetic acid are mixed together and heated at 60° – 70°C. with stirring for about one-half hour. A further quantity of concentrated ammonium hydroxide is added and the mixture allowed to stand for several hours at room temperature. As a result of these operations there is obtained the desired 4-amino-3,5,6-trichloro-2-pyridineacetamide which precipitates as a solid. The latter is filtered off, washed with water and recrystallized from ethanol to obtain a purified product having a molecular weight of 254.5.

EXAMPLE 23

In a manner similar to that described in Example 22, the following compounds are prepared:

The ethyl ester of ((4-amino-3,5,6-trichloro-2-pyridyl)methoxy)-acetic acid is reacted with ammonium hydroxide to prepare ((4-amino-3,5,6-trichloro-2-pyridyl)methoxy)-acetamide having a molecular weight of 284.4.

The ethyl ester of 4-amino-3,5,6-trichloro-2-pyridineacetic acid is reacted with a concentrated, aqueous solution of hydrazine to prepare the hydrazide of said acid having a molecular weight of 269.5.

The ethyl ester of ((4-amino-3,5,6-trichloro-2-pyridyl)methoxy)acetic acid is reacted with a concentrated aqueous solution of hydrazine to produce the hydrazide of said acid having a molecular weight of 299.5.

EXAMPLE 24

N-ethyl-3,5,6-trichloro-4-methylamino-2-pyridineacetamide 4.5 g. (0.1 mole) of ethylamine is added to a solution of 5.7 g. (0.02 mole) of the methyl ester of 3,5,6-trichloro-4-methylamino-2-pyridineacetic acid in 15 ml. of methanol. The resulting mixture is heated at reflux temperature for about one hour. At the end of this period, the reaction mixture is allowed to cool and then added to water to precipitate an N-ethyl-3,5,6-trichloro-4-methylamino-2-pyridineacetamide product. The latter is recovered by extracting the same with benzene and then distilling off the solvent. The molecular weight of the product is 296.5.

EXAMPLE 25

In a manner similar to that described in Example 24, the following compounds are prepared:

N-isopropyl-4-morpholino-3,5,6-trichloro-2-pyridineacetamide, having a molecular weight of 368.5, by the reaction of the isopropyl ester of 4-morpholino-3,5,6-trichloro-2-pyridineacetic acid and isopropylamine.

N-ethyl-((4-dimethylamino-3,5,6-trichloro-2-pyridyl)methoxy)-acetamide, having a molecular weight of 340.5, by the reaction of the ethyl ester of ((4-dimethylamino-3,5,6-trichloro-2-pyridyl)methoxy)-acetic acid and ethylamine.

N,N-diethyl-4-amino-3,5,6-trichloro-2-pyridineacetamide, having a molecular weight of 310.5, by the reaction of the ethyl ester of 4-amino-3,5,6-trichloro-2-pyridineacetic acid and diethylamine.

The methylhydrazide of 4-amino-3,5,6-trichloro-2-pyridineacetic acid, having a molecular weight of 283.5, by the reaction of the methyl ester of said acid and methylhydrazine.

The ethylhydrazide of ((4-amino-3,5,6-trichloro-2-pyridyl)methoxy)-acetic acid, having a molecular weight of 327.5 by the reaction of the ethyl ester of said acid and ethylhydrazine.

The compounds of the present invention have numerous agricultural applications. Thus, for example, they find utility as plant growth control agents, where they are advantageously employed in controlling, inhibiting or arresting the growth of undesirable terrestrial or aquatic plants and weed seeds. In other applications, the compounds may be used to control or eradicate soil-dwelling pests such as nematodes.

These methods may be carried out when employing the unmodified compounds and applying the same to pests or their habitats, to the aerial portions of plants, to plant parts, to soil, to water adjacent to aquatic plants or to other material or artificial plant growth media. However, the present invention also embraces the employment of a liquid or dust composition containing the compounds. In such usage, the compounds can be modified with one or a plurality of growth-altering adjuvants, or herbicide adjuvants, or paraciticide adjuvants and/or inert carriers. Such adjuvants and carriers include water, organic solvents, petroleum distillates, surface-active dispersing agents, aqueous emulsions (water-in-oil or oil-in-water) and finely divided solids such as chalk, talc, bentonite and other clays. The particular combination or composition to be employed will be guided by the particular results to be accomplished and is readily determined by the skilled in the art.

In compositions wherein the adjuvant or helper is a finely divided solid, a surface active agent, or the combination of a surface active agent and a liquid diluent, the carrier cooperates with the active component so as to facilitate the invention and to obtain an improved and outstanding result.

The exact concentration of the active component to be employed in the treating compositions is not critical and may vary considerably provided the required dosage of the effective agent is applied to the growth medium or upon the plant foliage or other body being treated.

The 4-amino-3,5,6-trichloro-2-(functionally substituted methyl)-pyridines of the present invention are useful as herbicides for the control of both preemergent seedlings and emerging plants. These products are particularly valuable for the control of broadleafed plants, and such use may be illustrated by the following representative operations.

Soil beds were variously planted to cereal crops and to a variety of weed pests. The chemicals enumerated below were dissolved in acetone and the resulting solution was then added in varying amounts to water so as to provide aqueous-acetone emulsions having various concentrations of the active component. Separate portions of each bed were then sprayed with the various emulsions so prepared. In each case, the amount of spray employed was sufficient to wet the upper 2 or 3 inches of soil. The seeded and treated plots were then observed after a period of several weeks to determine the level of application (in terms of pounds per acre) of the given chemical required to exert effective herbicidal activity of the indicated plant species, as evidenced by a 90 percent growth reduction. Other measurements were made of the maximum level of herbicide application at which there was no effective growth reduction on cereal plants. The following results were obtained:

```
(a) 4-amino-3,5,6-trichloro-2-pyridinemethanol
    mustard              1.25      lbs./acre
    water grass          2.5       do.
    burr clover          0.08      do.
    crab grass           0.31      do.
    wheat, oats and corn safe at 10 lbs./acre
(b) 4-amino-3,5,6-trichloro-2-pyridineacetic acid
    bind weed            0.62      lbs./acre
    pig weed             3.0       do.
    wheat safe at 1.25 lbs./acre
(c) ((4-amino-3,5,6-trichloro-2-pyridyl)methoxy-acetic acid
    bind weed            0.62      lbs./acre
    fox tail             5.0       do.
(d) 4-amino-3,5,6-trichloro-2-pyridineacetonitrile
    bind weed            0.31      lbs./acre
    fox tail             2.0       do.
    wheat safe at 0.62 lbs./acre
(e) 4-amino-3,5,6-trichloro-2-(chloromethyl)-pyridine
    bind weed            1.25      lbs./acre
    wheat safe at 2.0 lbs./acre
(f) 4-amino-3,5,6-trichloro-2-pyridyl)-methyl ester of
                                   acetic acid
    bind weed            0.08      lbs./acre
    fox tail             0.62      do.
    wheat safe at 0.31 lbs./acre
```

Other applications of the aqueous-acetone suspensions referred to above were made to plots of young cereal and weed plants. In these tests, the foilage of the plants was sprayed to run-off using emulsions of varying herbicide concentration. The plants were then grown for 2 weeks, following which the plots were graded to determine the level of application (in terms of parts by weight of the herbicide per million parts by weight of the spray) required to obtain 90 percent growth reduction. Other measurements were made of the maximum level of herbicide application at which there was no effective growth reduction on cereal plants. The following results were obtained:

```
(a) 4-amino-3,5,6-trichloro-2-(aminomethyl)-pyridine
    pig weed             200       parts per million
    wild radish          2000      do.
    crab grass           5000      do.
    corn        safe at  5000 - 10,000  do.   and
    wheat       do.      10,000    do.
(b) 4-amino-3,5,6-trichloro-2-pyridineacetic acid
    wild radish          2000      parts per million
    pig weed             500       do.
```

Another representative useful application is in nematode control. In such application, each of the chemicals 4-amino-3,5,6-trichloro-2-(methoxymethyl)-pyridine and (4-amino-3,5,6-trichloro-2-pyridyl)-methyl ester of methylcarbamic acid is applied to nematode-infested soil in the form of a water-acetone emulsion at a rate of 6 to 8 pounds per acre of the chemical. The composition is then worked into the soil to a depth of approximately 6 inches. When the soil is then planted to cucumbers, it is observed that the chemicals have given 100 percent controls of the nematodes.

The desirable compounds of the present invention may be represented by the formula

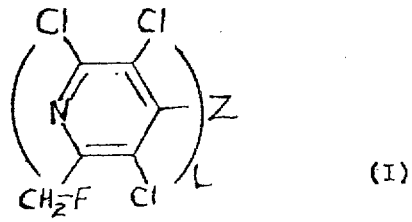

(I)

wherein Z is a residue of a nitrogen base having a basic dissociation constant Kb of $10^{-7}$ or greater, F is a functional group, and L is an integer which preferably is 1 but which may be as high as the number of basic nitrogens having a replaceable hydrogen in said nitrogen base.

For some applications, the preferred compounds are those wherein, in Formula I given above, L has a value of 1, Z is selected from the group consisting of amino, hydrazino, lower alkylamino containing from 1 to 4 carbon atoms, inclusive, lower alkenylamino containing from 3 to 4 carbon atoms, inclusive, lower alkynylamino containing from 3 to 4 carbon atoms, inclusive, di(lower alkyl)amino wherein each alkyl contains from 1 to 4 carbon atoms, inclusive, and pyrrolidino, and F is one of the following: a hydroxyl group (—OH), a halo group (—Cl, —I or —Br), an amino group (—NR'R'') a free carboxyl group (—COOH) or a nitrile (—CN), salt (—COOM'), amide (—CONR'R''), hydrazide (—CONHNH$_2$ or —CONHNHR''') or ester (—COOR'''') derivative thereof, an oxyaliphatic group (—OR'), an oxycarbamyl group (—OCONR'R''), an amino-oxyaliphatic group (—OR''''''NR'R''), an oxyalkanoyl group (—OC(O)R'''''') an oxyalkanoic acid group (—OR''''' COOH) or an ester (—OR'''''CO—OR''''), nitrile (—OR'''''CN), salt (—OR'''''COOM'), amide (—OR'''''CONR'R'') or hydrazide (—OR''''λ 'CONHNH$_2$ or —OR'''''CONHNHR''') derivative thereof, the various R' and R'' radicals employed herein being hydrogen or aliphatic groups containing from 1 to 10 carbon atoms, inclusive, the R''' radicals being aliphatic or aromatic groups of from 1 to 6 carbon atoms, inclusive, the R'''' radicals being residues of a hydroxy compound obtained by the removal of the —OH group, said compounds including lower alkyl esters, monoglycol lower alkyl ether esters and diglycol lower alkyl ether esters wherein glycol is of the ethylene and/or propylene series and lower alkyl contains from 1 to 10 carbon atoms, inclusive, R''''' being a divalent alkylene radical containing from 1 to 10 carbon atoms, inclusive, R'''''' being an alkyl radical containing from 1 to 10 carbon atoms, inclusive, and M' being a salt group inclusive of ammonium, alkali metal, lower alkyl amine, or lower alkanol amine salt, wherein each lower alkyl and lower alkanol radical contains from 1 to 10 carbon atoms, inclusive.

I claim:

1. A 4-amino-3,5,6-trichloro-2-(substituted methyl) pyridine compound having the formula

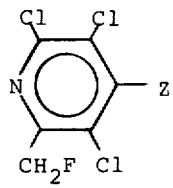

wherein Z is amino, loweralkylamino of 1 to 4 carbon atoms, or di(loweralkyl)amino wherein each alkyl contains 1 to 4 carbon atoms and F is an oxyalkanoic acid group of 1 to 4 carbon atoms, the loweralkyl esters thereof of 1 to 4 carbon atoms or the alkali metal or alkaline earth metal salts thereof.

2. The compound of claim 1 which is S((4-amino-3,5,6-trichloro-2-pyridyl)methoxy)acetic acid.

* * * * *